(12) United States Patent
Buchanan et al.

(10) Patent No.: US 8,864,182 B2
(45) Date of Patent: Oct. 21, 2014

(54) COUPLING DEVICE

(71) Applicants: Jackie Ray Buchanan, Nebo, IL (US);
Joseph Ray Buchanan, Nebo, IL (US)

(72) Inventors: Jackie Ray Buchanan, Nebo, IL (US);
Joseph Ray Buchanan, Nebo, IL (US)

( * ) Notice: Subject to any disclaimer, the term of this patent is extended or adjusted under 35 U.S.C. 154(b) by 0 days.

(21) Appl. No.: 13/759,699

(22) Filed: Feb. 5, 2013

(65) Prior Publication Data
US 2014/0041203 A1 Feb. 13, 2014

Related U.S. Application Data

(63) Continuation of application No. 29/429,441, filed on Aug. 10, 2012.

(51) Int. Cl.
F16L 23/00 (2006.01)
F16L 21/00 (2006.01)

(52) U.S. Cl.
CPC ............... F16L 21/007 (2013.01); F16L 21/00 (2013.01)
USPC .......................................... 285/415; 285/412

(58) Field of Classification Search
CPC ... F16L 23/024; F16L 23/0283; F16L 23/032; F16L 35/00
USPC .......................................... 285/415, 412, 114
See application file for complete search history.

(56) References Cited

U.S. PATENT DOCUMENTS

| | | | |
|---|---|---|---|
| 1,625,684 A * | 4/1927 | Roddy | 285/116 |
| 3,295,548 A * | 1/1967 | Woods | 239/732 |
| 3,633,945 A | 1/1972 | Press et al. | |
| 4,202,568 A | 5/1980 | Strom | |
| 4,494,776 A | 1/1985 | Press | |
| 4,871,198 A | 10/1989 | Hattori et al. | |
| 5,052,608 A * | 10/1991 | McClure | 228/44.5 |
| 5,072,972 A | 12/1991 | Justice | |
| 5,741,029 A * | 4/1998 | Wilson | 285/114 |
| 6,581,984 B1 * | 6/2003 | Seung-Kyu | 285/368 |
| 6,938,933 B2 | 9/2005 | Starita | |
| 2004/0108722 A1 | 6/2004 | Starita | |

* cited by examiner

Primary Examiner — Aaron Dunwoody
(74) Attorney, Agent, or Firm — Schafer Smith LLC

(57) ABSTRACT

A coupling device may increase the integrity of a pipe joint. The coupling device may include a first pipe encircling device and a second pipe encircling device connected across the pipe joint by a spanning element. The pipe encircling device may be made up of at least two approximately c-shaped segments. The multi-part nature of the pipe encircling devices may facilitate installation of the coupling device at an excavation site.

8 Claims, 6 Drawing Sheets

COUPLING DEVICE

RELATED APPLICATIONS

The present patent document claims the benefit of priority to Design Pat. Application No. 29/429,441, filed Aug. 10, 2012, and entitled "COUPLING DEVICE," the entire contents of each of which are incorporated herein by reference.

BACKGROUND

Urban and rural water management may rely on the use of, for example but not limited to, underground pipe or tube systems. Laying underground pipe or tube systems may involve ground excavation. The ground excavation required may be only a few feet or may be up to 20 feet or more.

Several types of pipes or tubes may be used to channel water underground, underwater, above ground, or elsewhere. Pipes may be made of various materials, for example, steel pipes, metal pipes, metal alloy pipes, treated pipes, coated pipes, continuous plastic pipes, tile pipes, PVC pipes, and otherwise.

Double wall corrugated plastic pipes are one type of pipe used for underground water systems. Double wall corrugated plastic pipes may be made of concentric layers of plastic (for example but not limited to polyethylene, high density polyethylene, polypropylene or poly vinyl chloride). An inner layer of plastic may have a smooth surface. An external surface may have a corrugated surface.

Pipes come in various dimensions. The length or diameter of the pipe may influence the efficiency and/or expense of laying the pipe as well as the longevity of the pipe. For example, pipe may be manufactured in multiple lengths, for example, lengths (in feet) of 1, 2, 3, 4, 5, 6, 7, 8, 9, 10, 11, 12, 13, 14, 15, 16, 17, 18, 19, 20, and greater lengths. The pipe may also be manufactured in lengths (in feet) of 1.5, 2.5, 3.5, 4.5, 5.5, 6.5, 7.5, 8.5, 9.5, 10.5, 11.5, 12.5, 13.5, 14.5, 15.5, 16.5, 17.5, 18.5, 19.5, 20.5, and greater. Pipes may be manufactured in various diameters, for example, (in inches) of 4, 6, 7, 8, 10, 12, 15, 16, 24, 36, and greater. The pipe may also be manufactured in diameters (in inches) of 4.5, 6.5, 9.5 and greater. Pipes manufactured in lengths less than, for example, 14 feet, 13 feet, 12 feet, 10 feet, and etc. or pipes of smaller diameter, 8 inches, 6 inches, 4 inches, and etc. may have transportation and cost efficiencies. Pipes of longer lengths or greater diameters may require special order (increasing the time of production or construction times) and may also require transport on semi's. They may also require large, expensive, specialized machinery for maneuvering (e.g., industrial cranes). Shorter pipe lengths may be standard issue for off the shelf purchase. Shorter pipes may not require semi transportation. Shorter pipes may be of a size more easily maneuvered by standard sized equipment such as tractors, skid loaders, and etc. Alternatively or additionally, shorter pipes may be of a size maneuverable by man power.

BRIEF SUMMARY

The present invention is defined by the following claims, and nothing in this section should be taken as a limitation on those claims.

A coupling device may increase the integrity of a pipe joint. The coupling device may include a first pipe encircling device and a second pipe encircling device connected across the pipe joint by a spanning element.

Other systems, methods, features and advantages of the disclosure will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

Figure 1:
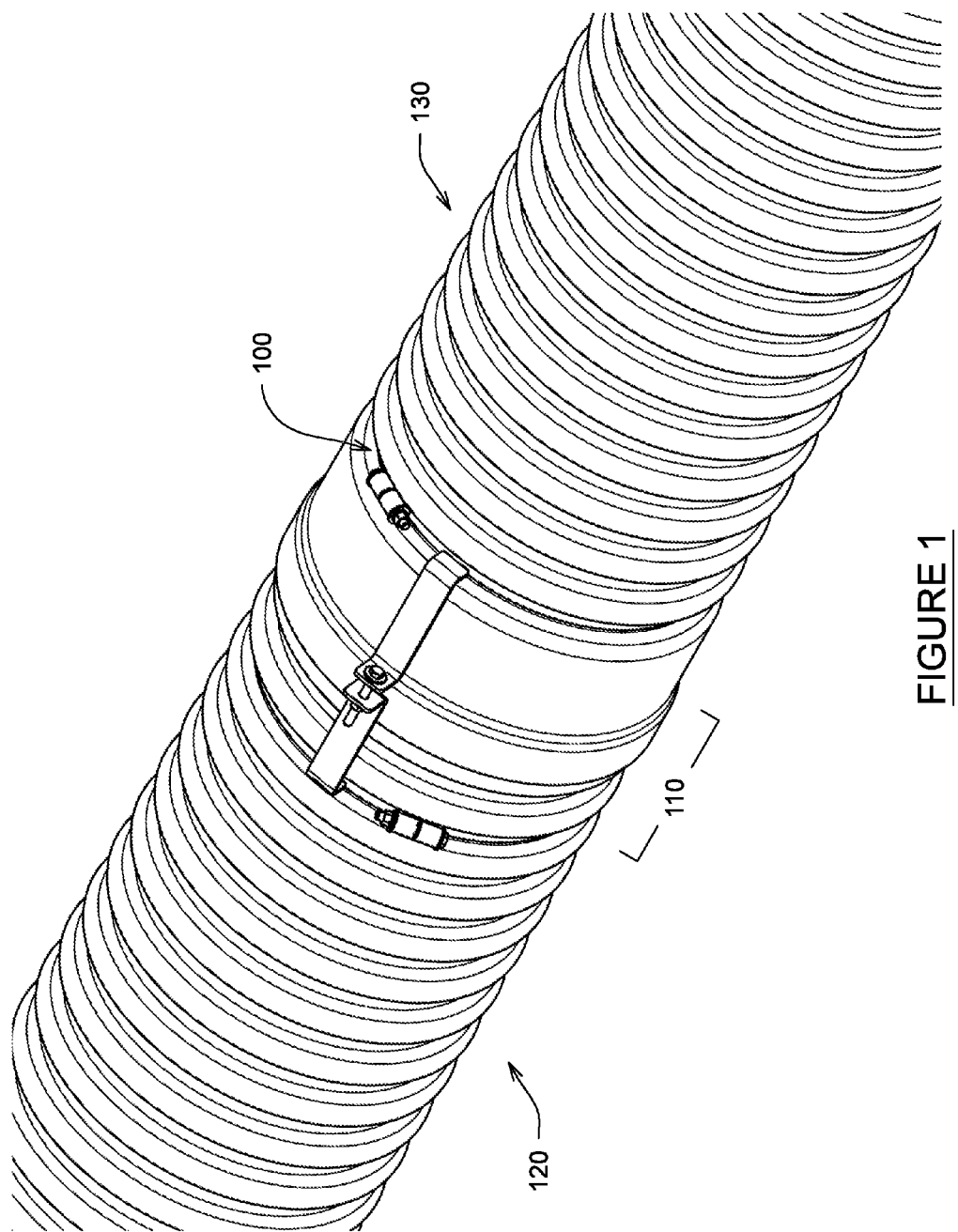
FIG. 1 illustrates a coupling device assembled with two pipes.

Connecting devices may be used to connect multiple pipes together, for example, when the pipe length manufactured does not cover a necessary distance. Multiple connecting devices may be required, for example, when shorter pipes are used, for example but not limited to lengths of, 5-14 meter, 6-12 meter, and/or 6 meter, 7 meter, 8 meter, 9 meter, 10 meter, 11 meter, 12 meter, 12.5 meter, 13 meter, 14 meter and dimensions in between. The diameter of a pipe may also impact the amount of connecting devices needed. Connecting devices may perform functions including but not limited to, increasing the water tight fit between consecutive sections of pipe, increasing the tightness of the connection between consecutive sections of pipe, decreasing the tendency of consecutive sections of pipe to disengage when acted on by pressure, vibrations, ground movement, water movement, thermal expansion, thermal contraction, and other forces.

As an example, a double wall corrugated pipe may be manufactured with a first end and a second end. The first end may be a "female" end and the second end may be a "male" end. When multiple pipes are installed, they may be installed such that a female end is mated with a male end. The pipes may include a ridge structure, a gasket structure, or otherwise include a complementary fitting pattern such that the male end and the female end mating is maintained. However, the strength of conventional mating between consecutive lengths of pipe may lack integrity. Over a season or a year, the pipes are subjected to multiple types of ground conditions (freezing, flooding, tremors, and etc.). Ground conditions and natural shifting may disengage the mating of the pipes.

In many situations, due to the size of the pipes and the difficulty maneuvering the pipes, mating the male end and the female end is difficult. Misalignment between the male and female end may occur due to the difficulty of mating the ends. The pipes are often big and assembly is often carried out in excavation sites. The conditions of the excavation site can vary widely, introducing many different types of challenges to successful mating of the pipes.

When the pipes come apart underground, whether due to misalignment, or ground movement acting upon properly aligned pipes, or otherwise, the pipes must be re-excavated and replaced and/or repaired. Pipe separation is common and may lead to, for example but not limited to, water service disruption, ground pollution, water loss, and great expense.

A coupling device may increase the efficiency of laying underground pipe, increase joint fidelity of joined pipe sections, and decrease the cost of maintaining underground pipe systems.

A designer, for example, a designer of underground pipe systems, may select from a wide range of pipe products to meet job requirements. Pipes may vary in size, e.g., length, diameter, and otherwise. Therefore, dimensioning the disclosed coupling device to the size of the pipe chosen for a job is contemplated.

Figure 2:
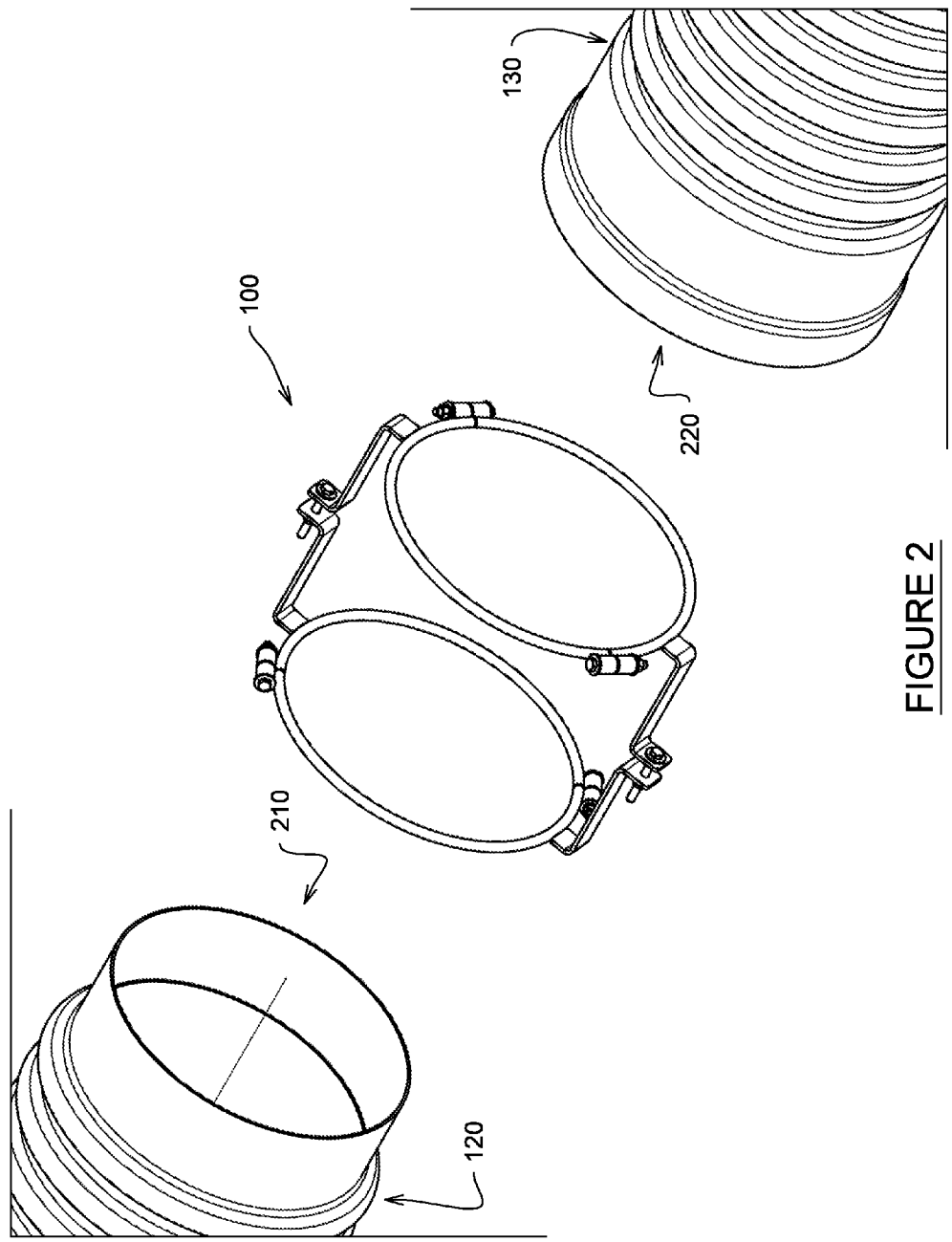
FIG. 2 illustrates a coupling device, a first pipe, and a second pipe, illustrating exemplary mating ends.

FIG. 1 illustrates an exemplary coupling device 100 assembled at a pipe joint 110 of a first pipe 120 and a second pipe 130. A first pipe 120 may mate with a second pipe 130 at the pipe joint 110. Turning to FIG. 2, the first pipe 120 may have a mating end 210. The second pipe 130 may have a mating end 220. The first pipe 120 may assemble with the second pipe 130 by inserting the mating end 210 of the first pipe 120 into the mating end 220 of the second pipe 130. There are numerous pipe end constructions that permit pipe joining. The coupling device 100 may be used with many types of pipe joints and is not limited to joining pipes of the nature shown in FIG. 2.

Figure 3:
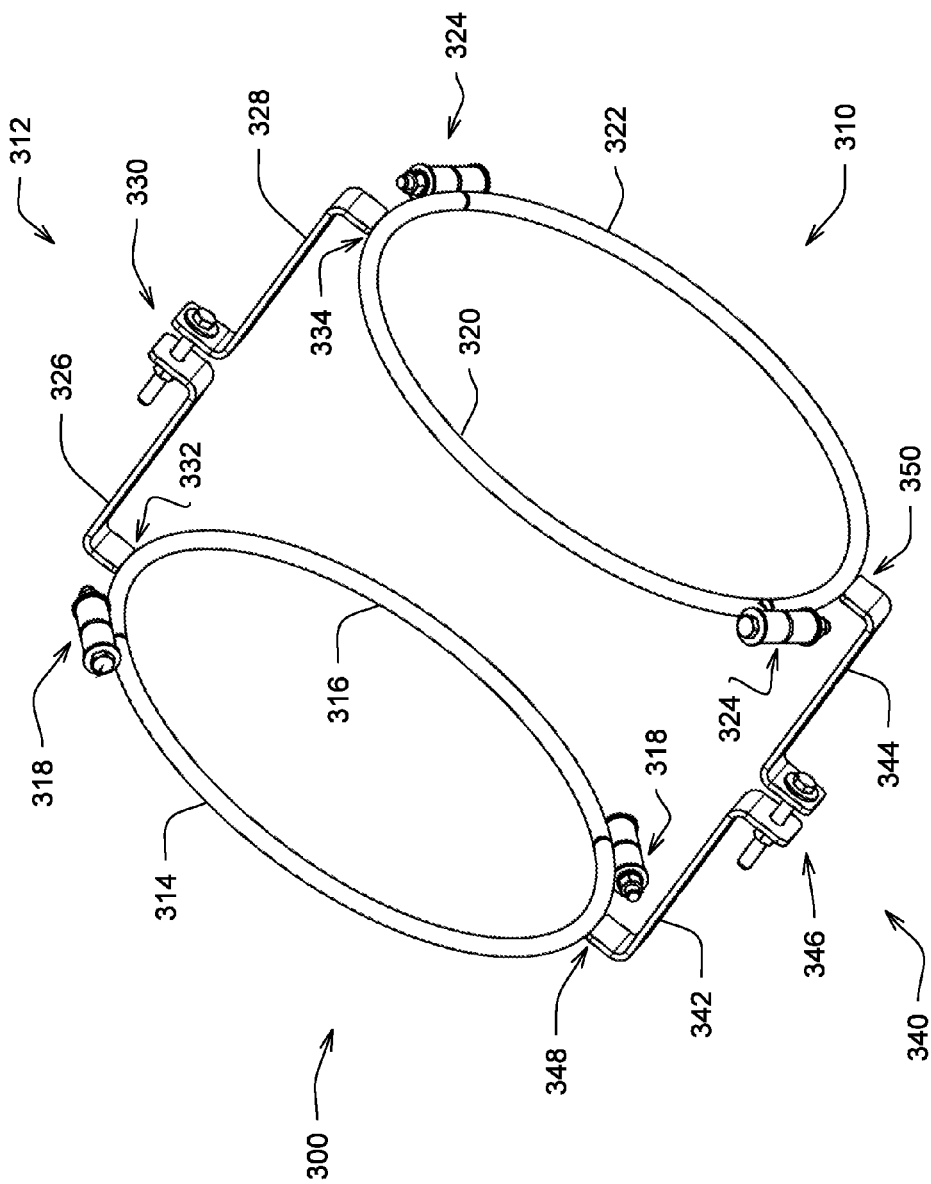
FIG. 3 is a detailed illustration of an exemplary coupling device.

FIG. 3 illustrates an exemplary coupling device 100. A coupling device 100 may include a first encircling device 300 and a second encircling device 310. The first encircling device 300 and the second encircling device 310 may be reversibly joined by at least one spanning element 312. The first encircling device 300 may include a first approximately c-shaped segment 314 and a second approximately c-shaped segment 316. The first approximately c-shaped segment 314 and the second approximately c-shaped segment 316 may be reversibly and/or permanently connected into a first encircling device 300 by at least one band coupling 318. While two band couplings 318 are shown, at least one band coupling 318 may be replaced, e.g., by a hinge and accomplish the same result (e.g., assembling the first approximately c-shaped segment 314 and the second approximately c-shaped segment 316 into a first encircling device 300.) The band coupling 318 may be a lug-type coupling as shown, or it may be different types of couplings known in the art, for example but not limited to bar and strap, wedge and strap, threading, or otherwise.

The second encircling device 310 may include a first approximately c-shaped segment 320 and a second approximately c-shaped segment 322. The first approximately c-shaped segment 320 and the second approximately c-shaped segment 322 may be reversibly and/or permanently connected into a second encircling device 310 by at least one band coupling 324. While two band couplings 324 are shown, at least one band coupling 324 may be replaced, e.g., by a hinge and accomplish the same result (e.g., assembling the first approximately c-shaped segment 320 and the second approximately c-shaped segment 322 into a second encircling device 310.) The band coupling 324 may be a lug-type coupling as shown, or it may be different types of couplings known in the art, for example but not limited to bar and strap, wedge and strap, threading, or otherwise.

A spanning element 312 may include a first fastener segment 326 and a second fastener segment 328. The first fastener segment 326 may be connected to the second fastener segment 328 at spanner coupling 330. The spanner coupling 330 is shown as a bolt and nut coupling, but other couplings may be utilized. In the example shown, the first fastener segment 326 may be connected to the second approximately c-shaped segment 316 of the first encircling device 300 at a connection point 332. The second fastener segment 328 may be connected to the first approximately c-shaped segment 320 of the second encircling device 310 at a connection point 334.

A spanning element 340 may include a first fastener segment 342 and a second fastener segment 344. The first fastener segment 342 may be connected to the second fastener segment 344 at spanner coupling 346. The spanner coupling 346 is shown as a bolt and nut coupling, but other couplings may be utilized. In the example shown, the first fastener segment 342 may be connected to the first approximately c-shaped segment 314 of the first encircling device 300 at a connection point 348. The second fastener segment 344 may be connected to the second approximately c-shaped segment 322 of the second encircling device 310 at a connection point 350.

Alternatively or additionally, the approximately c-shaped segments 314, 316, 320, 322 may be redimensioned such that two fastener segments, e.g., 326 and 342 and/or 344 and 328 may be located on the same approximately c-shaped segment, e.g., 314, 316, 320, or 322 and still fall within the disclosure.

The first encircling device 300 and the second encircling device 310 may be dimensioned to encircle a pipe. Pipe diameters may vary widely depending on the contemplated job. Pipe diameters may include but are not limited to 4-18 inches, 21-48 inches, 54-96 inches, 6-10 inches, 12-27 inches, 30-42 inches, 48-66 inches, 72-84 inches, 90-96 inches and diameters in between. A pipe, such as a double-wall corrugated pipe, may have multiple diameters. Double wall corrugated plastic pipes may be made of concentric layers of plastic (for example but not limited to polyethylene, high density polyethylene, polypropylene or poly vinyl chloride). An inner layer of plastic may have a smooth surface. An external surface may have a corrugated surface. The inner layer may have a diameter, and the outer layer may have a diameter representing the widest point (peak of a corrugation) and a diameter representing the trough of a corrugation.

Figure 4A:
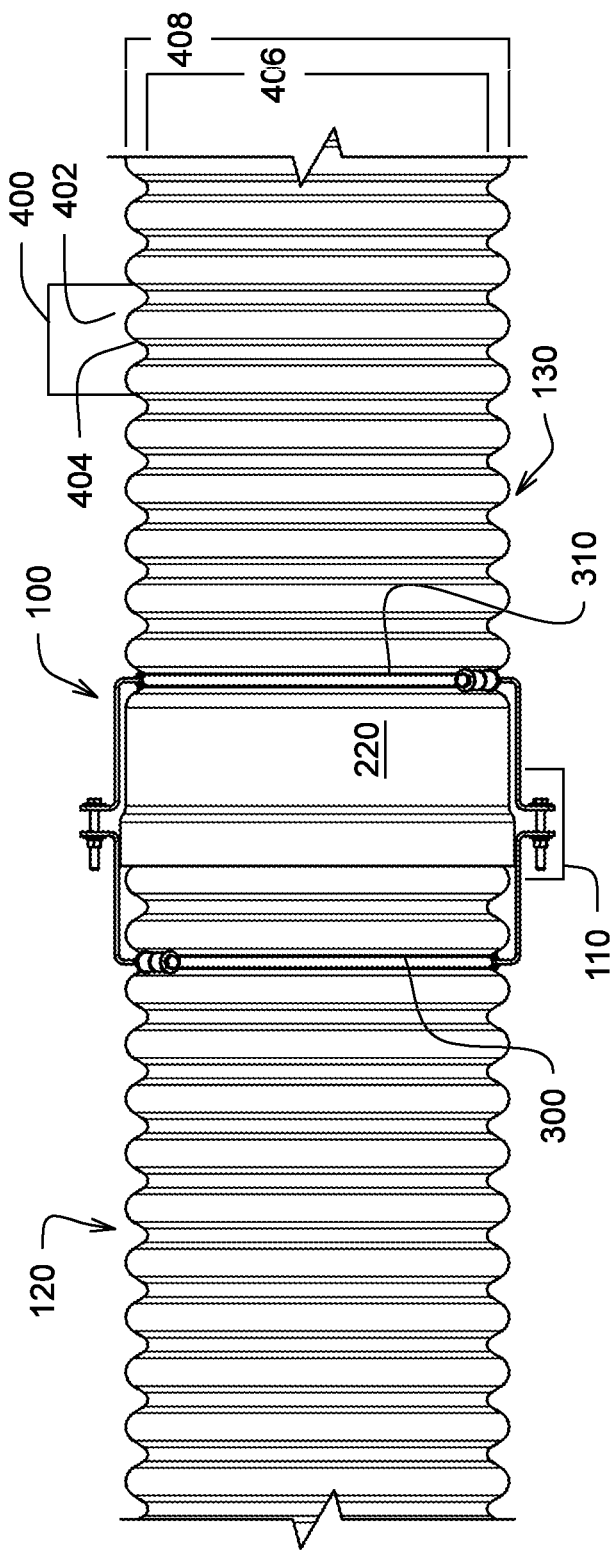
FIGS. 4A and 4B is a second illustration of a coupling device assembled with pipes.

Turning to FIG. 4A, a pipe, e.g., a first pipe 120 and/or a second pipe 130 may have a corrugation. The region designated 400 illustrates a corrugation region. A corrugation 400 may include a peak 402 and a trough 404. A pipe, e.g., a first pipe 120 and/or a second pipe 130 also having a corrugation 400 may have a first diameter 406 which may be the diameter of the pipe at the trough 404. A pipe, e.g., a first pipe 120 and/or a second pipe 130 also having a corrugation 400 may have a second diameter 408 which may be the diameter of the pipe at the peak 402.

Of pipe 120, the first encircling device 300 may be dimensioned to nest within the trough 404 of a corrugation 400. The first encircling device 300 may have a diameter that permits it to accommodate the diameter of a pipe at the trough 406 such that the first encircling device 300 is capable of securely nesting within the trough 404 of a corrugation 400.

Of pipe 130 the second encircling device 310 may be dimensioned to nest within the trough 404 of a corrugation 400. The second encircling device 310 may have a diameter that permits it to accommodate the diameter of a pipe at the trough 406 such that the second encircling device 310 is capable of securely nesting within the trough 404 of a corrugation 400.

A coupling device 100 may be assembled across a pipe joint 110. The coupling device 100 may increase the fidelity of the pipe joint 110, for example, by securing the mating ends 210, 220 in configuration. The mating end 210 of the first pipe 120 is not shown because it is inserted inside of the mating end 220 of the second pipe 130.

Many types of pipe are manufactured with mating ends or other means for allowing one pipe to join a second pipe to create a pipeline. Often, due to ground conditions, weather conditions, high pressures, disjointing forces, ground shifting, and otherwise, the integrity of the pipe joint 110 may be compromised. Often pipelines are designed and installed without reinforcing joints. Currently, the joint reinforcement products are difficult to install on the pipes (e.g., due to the large size of pipe). A coupling device 100 comprising of a segmented arrangement may be easier to install, have increased integrity over non-reinforced pipe joints, and result in reduced pipeline maintenance costs. Costs may be significantly reduced because the problem of compromised joints (e.g., leaking, broken, cracked, etc.) is often resolved by using increased pipe lengths, thereby decreasing the number of joints, and resulting in expensive repair scenarios. Compromised joints require expensive re-excavation procedures to repair or replace the damaged pipes. Greater pipe lengths increase, costs, including but not limited to upfront installation costs by requiring more expensive machinery to lift and manipulate the lengths of pipe, and more expensive freighting to deliver the pipe to the excavation site. By using a coupling device 100 to reinforce pipe joints, expenses are reduced considerably at both the installation and maintenance stages. Additionally, the coupling device 100 has the advantage of being quickly disassembled for easier removal of the pipes as replacement becomes necessary, or the components of coupling device 100 may be replaced piecemeal should individual parts fail.

A coupling device 100 may include two or more encircling devices 300, 310. While two are shown, more encircling devices 300, 310 may be added in series to increase the fidelity or strength of the device. Similarly, additional spanning elements 312, 340 with respective connection points 332, 334, 348, 350 and fastener segments 326, 328, 342, 344 may be utilized on a pair, or more, of encircling devices 300, 310 to increase the integrity of coupling device 100. FIG. 4 illustrates an example of a coupling device 100 assembled across a pipe joint 110. This figure illustrates a first pipe 120 and a second pipe 130 mated at a pipe joint 110. The mating end 210 of the first pipe 120 is not shown because it is inserted inside of the mating end 220 of the second pipe 130. The coupling device 100 reinforces the pipe joint 110.

The coupling device 100 assembles with the first pipe 120 and the second pipe 130. The first encircling device 300 nests within a trough 404 near the mating end 210 of the first pipe 120. (The exact location (e.g., distance from the mating end 210) may be optimized based on the job parameters, field conditions, design constraints or specifications.) The second encircling device 310 nests within a trough 404 near the mating end 220 of the second pipe 130. Spanning elements 312 and 340 reversibly connect the first encircling device 300 and the second encircling device 310 over the pipe joint 110.

Each of the first encircling device 300 and the second encircling device 310 are made up of at least two approximately c-shaped segments 314, 316 and 320, 322 respectively. The at least two approximately c-shaped segments allow the coupling device 100 to be more easily assembled on the pipe. For example, one approximately c-shaped segment may be positioned in the excavation site, the pipe may be positioned over the approximately c-shaped segment, and then the second approximately c-shaped segment may be assembled to the exposed or top surface of the pipe and secured into the encircling device at the coupling points 318, 324.

The spanning elements 312 and 340 are also in multiple parts, e.g., fastener segments 326, and 328 and fastener segments 342 and 344 respectively. Once the pipe joint 110 is formed by the mating of two pipes, e.g., a first pipe 120 and a second pipe 130, the spanning elements 312 and 340 may be assembled by coupling the fastener segments at a spanner coupling 330, 346. For example, fastener segments 326, and 328 may be coupled at spanner coupling 330 into spanning element 312. Fastener segments 342 and 344 may be coupled at spanner coupling 346 into spanning element 340.

Figure 4B:
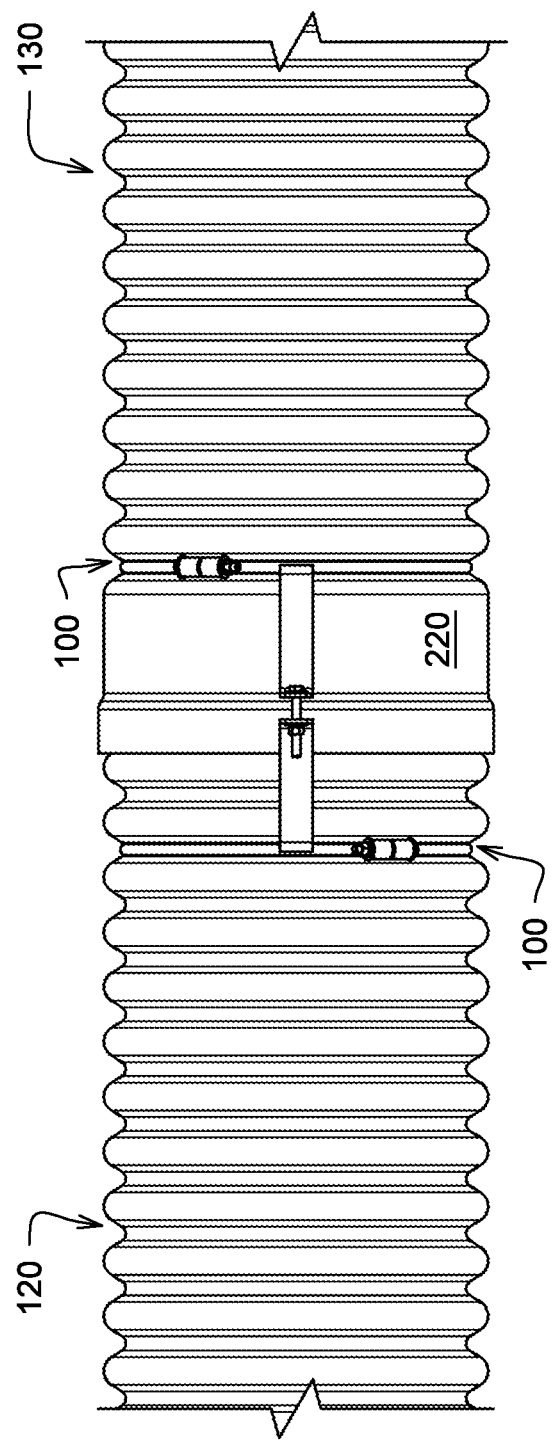

FIG. 4B illustrates an alternative view of a coupling device. The location of the couplers 330 and 346 may vary depending on the application and needs of the job site.

Figure 5:
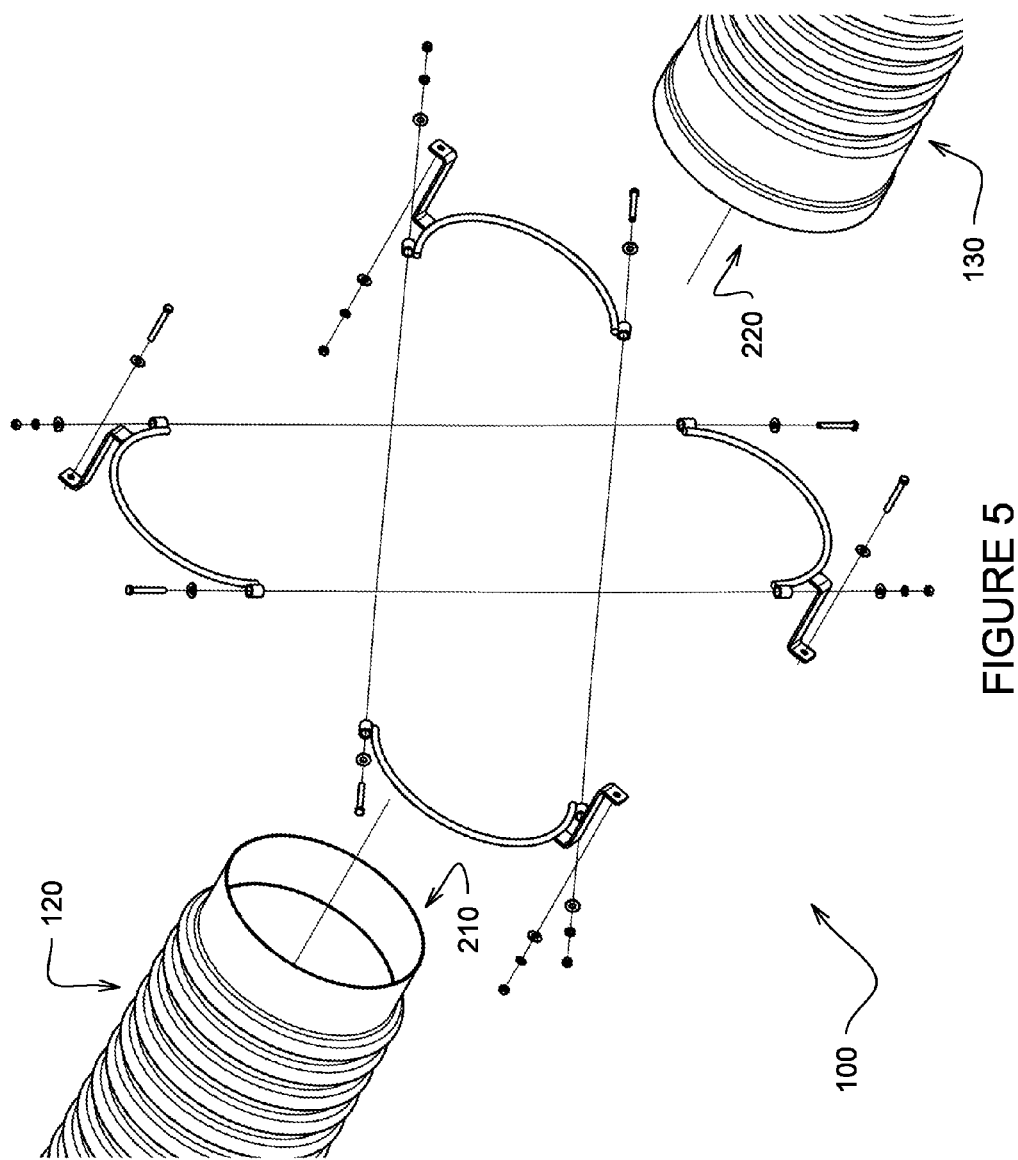
FIG. 5 is an exemplary coupling device fully disassembled.

FIG. 5 is an exploded illustration of a coupling device fully disassembled to illustrate the various elements.

The encircling device 300, 310 may comprise of various materials, for example and not limited to, metals, metal alloys, treated metals (e.g. galvanized), coated materials (e.g. epoxy), polymers, or any in combination. For example, the encircling device 300, 310 may be constructed of a specific material, whereas the fastener segments 326, 328, 342, 344 or the spanning elements 312, 340 may be constructed of a different material as the job parameters, field conditions, design constraints or specifications dictate.

In another variation, the spanning element 312, 340 and/or the fastener segments 326, 328, 342, 344 may be assembled with the encircling devices 300, 310 in a manner that allows the encircling devices 300, 310 to rotate relative to the spanning element 312, 340.

While various embodiments of the invention have been described, it will be apparent to those of ordinary skill in the art that many more embodiments and implementations are possible that are within the scope of the invention. For instance, steps of a method as displayed in the figures or reflected in the claims do not require a specific order of execution by way they are presented, unless specified. The disclosed steps are listed as exemplary such that additional or different steps may be executed or the steps may be executed in a different order.

The invention claimed is:

1. A device comprising;
   a first pipe and a second pipe; and
   a first pipe encircling device and a second pipe encircling device;
   the first pipe encircling device and the second pipe encircling device each comprising a first approximately c-shaped segment and a second approximately c-shaped segment, the first approximately c-shaped segments reversibly assembled with the second approximately c-shaped segment at a band coupling into the encircling device;
   a first spanning element and a second spanning element reversibly coupling the first pipe encircling device and the second pipe encircling device;
   the first spanning element connected to the second approximately c-shaped segment of the first pipe encircling device near the band coupling;
   the first spanning element connected to the first approximately c-shaped segment of the second pipe encircling device near the band coupling;
   the second spanning element connected to the first approximately c-shaped segment of the first pipe encircling device near the band coupling;
   the second spanning element connected to the second approximately c-shaped segment of the second encircling device near the band coupling;
   the first pipe encircling pipe device dimensioned to encircle the first pipe and the second pipe encircling device dimensioned to encircle the second pipe;
   the first pipe comprising a mating end and the second pipe comprising a mating end;
   the mating end of the first pipe dimensioned to be mated with the mating end of the second pipe at a pipe joint;
   the first pipe and the second pipe further comprising corrugated surface comprising a plurality of corrugation, the corrugation comprising a trough and a peak;

the first pipe encircling device dimensioned for positioning within the trough of the corrugation of the first pipe and the second pipe encircling device dimensioned for positioning within the trough of the corrugation of the second pipe;

the fastener capable of reversibly coupling the first pipe encircling device and the second pipe encircling device across the pipe joint.

2. The coupling device of claim 1, the spanning element further comprising a first fastener segment and a second fastener segment reversibly connected by a spanner coupling.

3. The coupling device of claim 2, wherein at least one of the first approximately c-shaped segment of the first pipe encircling device and the second approximately c-shaped segment of the first pipe encircling device further comprises the first fastener segment.

4. The coupling device of claim 2, wherein at least one of the first approximately c-shaped segment of the second pipe encircling device and the second approximately c-shaped segment of the first pipe encircling further comprises the second fastener segment.

5. A coupling device comprising;
a first pipe and a second pipe; and
a first pipe encircling device and a second pipe encircling device;
at least one spanning element reversibly coupling the first pipe encircling device and the second pipe encircling device;
the first pipe encircling device and the second pipe encircling device each comprising a first approximately c-shaped segment and a second approximately c-shaped segment, the first approximately c-shaped segments reversibly assembled with the second approximately c-shaped segment at a band coupling into the encircling device;
a first spanning element and a second spanning element reversibly coupling the first pipe encircling device and the second pipe encircling device;

the first pipe encircling pipe device dimensioned to encircle the first pipe and the second pipe encircling device dimensioned to encircle the second pipe;

the first pipe comprising a mating end and the second pipe comprising a mating end;

the mating end of the first pipe dimensioned to be mated with the mating end of the second pipe at a pipe joint;

the first pipe and the second pipe further comprising a corrugated surface comprising a plurality of a corrugation, the corrugation comprising a trough and a peak;

the first pipe encircling device dimensioned for positioning within the trough of the corrugation of the first pipe and the second pipe encircling device dimensioned for positioning within the trough of the corrugation of the second pipe;

the spanning element capable of reversibly coupling the first pipe encircling device and the second pipe encircling device across the pipe joint;

the first pipe encircling device and the second pipe encircling device rotatable relative to the spanning element.

6. The coupling device of claim 5, the spanning element further comprising a first fastener segment and a second fastener segment reversibly connected by a spanner coupling.

7. The coupling device of claim 6, wherein at least one of the first approximately c-shaped segment of the first pipe encircling device and the second approximately c-shaped segment of the first pipe encircling device further assembles with the first fastener segment such that the encircling device is rotatable relative to the first fastener segment.

8. The coupling device of claim 5, wherein at least one of the first approximately c-shaped segment of the second pipe encircling device and the second approximately c-shaped segment of the first pipe encircling further comprises the second fastener segment such that the encircling device is rotatable relative to the second fastener segment.

* * * * *